No. 746,797. PATENTED DEC. 15, 1903.
P. DANCKWARDT.
PROCESS OF SEPARATING METALS FROM MATTE OR ORE.
APPLICATION FILED JUNE 20, 1903.
NO MODEL.

Witnesses:
Arthur Zumyer
William Schulz

Inventor:
Paul Danckwardt
by his attorney
Hanks v Friesen

No. 746,797. Patented December 15, 1903.

UNITED STATES PATENT OFFICE.

PAUL DANCKWARDT, OF DEADWOOD, SOUTH DAKOTA.

PROCESS OF SEPARATING METALS FROM MATTE OR ORE.

SPECIFICATION forming part of Letters Patent No. 746,797, dated December 15, 1903.

Application filed June 20, 1903. Serial No. 162,339. (No specimens.)

*To all whom it may concern:*

Be it known that I, PAUL DANCKWARDT, a citizen of the United States, residing at Deadwood, Lawrence county, South Dakota, have invented certain new and useful Improvements in Processes of Separating Metals from Matte or Ore, of which the following is a specification.

This invention relates to an improved process for treating matte or ores of a similar constitution—such as sulfid or sulfid-arsenid ores, commonly called "pyrites"—for the separation of the valuable metals. By my process these valuable metals—such as gold, silver, copper, lead, or nickel—are separated from the iron compounds with which they are associated, such compounds forming generally by far the largest part of the matte or ore.

Briefly stated, the invention consists in mixing the matte or ore with a carbid or with carbid-forming materials and heating the mixture under the exclusion of air.

By "carbid-forming materials" I mean an oxid or carbonate of a metal forming a carbid and carbon in its raw state—such, for instance, as coal or coke.

Figure 1:
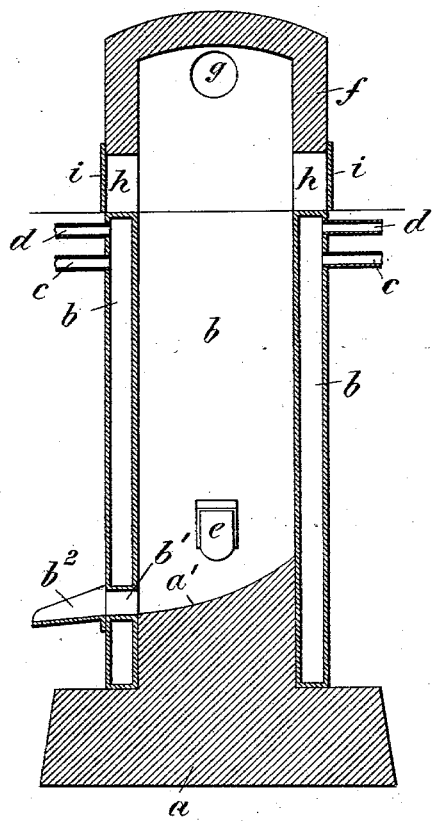
Figure 2:
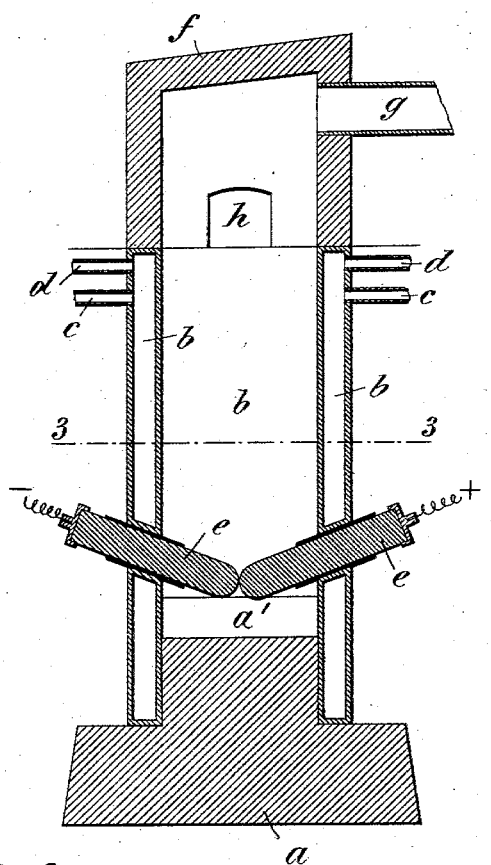
Figure 3:
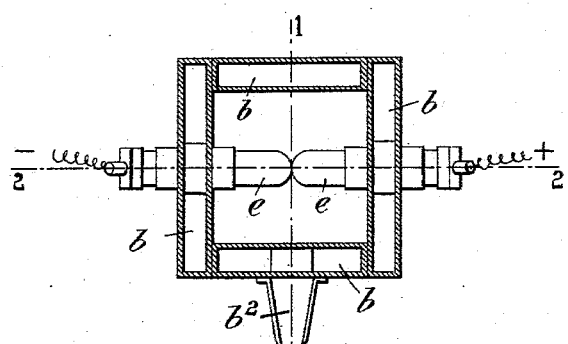

In the accompanying drawings, Figure 1 is a vertical section of a furnace for carrying my invention into effect on line 1 1, Fig. 3; Fig. 2, a similar section on line 2 2, Fig. 3; and Fig. 3, a horizontal section on line 3 3, Fig. 2.

The furnace is composed of a fireproof base $a$, that supports four water-jackets $b$, having water-inlet pipes $c$ and outlet-pipes $d$. The furnace is further provided with a tap-hole $b'$ and a spout $b^2$ above the lowest point of the slanting bottom $a'$. Two opposite jackets $b$ are perforated for the reception of insulated and movable inclined carbon blocks $e$. The top of the furnace is covered by a brick or metal hood $f$, having flue $g$ for the escape of gases and openings $h$, with doors $i$, for the introduction of the charge.

In carrying my process into effect I proceed as follows: I charge the furnace through openings $h$ with a mixture of the matte or iron-sulfid or arsenid ore carrying the valuable metals with the carbid or with carbid-forming ingredients. If limestone and carbon are used, I take about 0.473 parts of limestone and 0.066 parts of coke for each ton of ore if the percentage of metals is such as in the formula below. After the introduction of the charge the openings $h$ are closed to exclude the air and the interior of the furnace is heated by turning on the current into the carbon blocks $e$.

The proportions of matte or ore and the carbid or carbid-forming materials must be such that the carbid will be just sufficient to reduce all the sulfids or the arsenids of the valuable metals to be separated, but not sufficient to reduce the iron sulfid to the metallic state. To illustrate, I will assume a copper-lead-iron matte carrying gold and silver. As the proportion of gold and silver is usually insignificant, it may be omitted in the formula expressing the reaction which sets in when the current is turned on.

In carrying out my process I prefer to use carbid-forming materials—*i. e.*, lime and carbon—in place of ready carbids, as the carbid *in statu nascendi* gives better results. If expressed in two formulas, the reaction is as follows:

$$2CaCO_3 + 6C = 2CaC_2 + 2CO + 2CO_2$$

and $$CuS + PbS + FeS + 2CaC_2 = Cu + Pb + 2CaS + FeS + 4C.$$

If written in one formula, it will be as follows:

$$2CaCO_3 + 2C + CuS + PbS + FeS = Cu + Pb + 2CaS + FeS + 2CO + 2CO_2.$$

It will be seen that with the above materials for one molecule of copper sulfid and one molecule of lead sulfid there are required two molecules of carbid or the corresponding quantities of limestone and carbon, or if the materials are proportioned to that part of the sulfur contained in the charge which is to be united with the metal of the carbid or carbid-forming materials in order to set free the copper and lead there is required for one atom of sulfur one atom of calcium corresponding to one molecule of the carbid. As the sulfur is the part that is to be transferred from the valuable metals to the carbid-forming metal, it is plain that with a matte consisting of subsulfids—for instance, $Cu_2S$ and $Fe_2S$—there is required only half the amount of carbid or carbid-forming materials. On the other hand, with a higher sulfid ore—for instance, $CuS_2$ and $FeS_2$—more carbid or carbid-forming material must be used.

The formulas above given refer only to a pure sulfid matte or ore; but it frequently occurs that mattes or ores contain considerable quantities of other elements which take the place of sulfur—mainly arsenic and antimony. The process with these materials is the same as above described. Here also the object is to remove the sulfur and arsenic or antimony only from the valuable metals, and consequently but such an amount of carbid or carbid-forming materials is to be added as is sufficient to take up the sulfur or the corresponding elements of the valuable-metal compounds.

While the process is going on there will run out of the furnace a metal or an alloy carrying the gold and silver of the matte or ore and a changed iron matte and calcium sulfid or arsenid, &c., with some slag formed by impurities of the charge. The metal or metals can be separated from the latter in any of the well-known methods, while a new charge is introduced at the top.

If instead of the lime and carbon a mixture of iron oxid or carbonate and carbon is used, which may be of advantage under certain conditions, the sulfur or arsenic, &c., will be taken up by the iron of the carbid thus formed. The product running from the furnace in this case is consequently only metal or metallic alloy and an increased quantity of sulfid of iron, with some slag. The reaction is the same as the carbid of iron, or the metal of the carbid-of-iron-forming materials will reduce the sulfids, arsenids, &c., of the valuable metals, but will not attack the iron sulfid of the matte or ore.

The advantages of this process are the cool top of the furnaces and the absence of flue-dust, both factors saving metals, and, further, the separation of the valuable metals from the iron matte or ore in one operation, no preparatory metallurgical operations being required. It also renders it possible to utilize the sulfur or arsenic for industrial purposes, while with the present methods of treating matte or ore these elements not only are lost, but most always constitute a great nuisance by being discharged into the open air.

What I claim is—

1. The process of separating valuable metals from metal sulfids and arsenids containing iron sulfid, which consists in electrically heating the metal sulfids and arsenids under the exclusion of air with such a quantity of a carbid of any metal as will reduce the sulfids and arsenids of the valuable metals to a metallic state, without reducing the iron sulfid contained in the metal sulfids, substantially as specified.

2. The process of separating valuable metals from metal sulfids and arsenids containing iron sulfid, which consists in mixing the latter with carbid-forming materials, heating the mixture to produce a carbid which *in statu nascendi* will reduce the sulfids and arsenids of the valuable metals to a metallic state, without reducing the iron sulfids contained in the metal sulfids, substantially as specified.

Signed by me at Deadwood, Lawrence county, South Dakota, this 15th day of June, 1903.

PAUL DANCKWARDT.

Witnesses:
G. W. INGLIS,
R. N. OGDEN.